Figure 10:
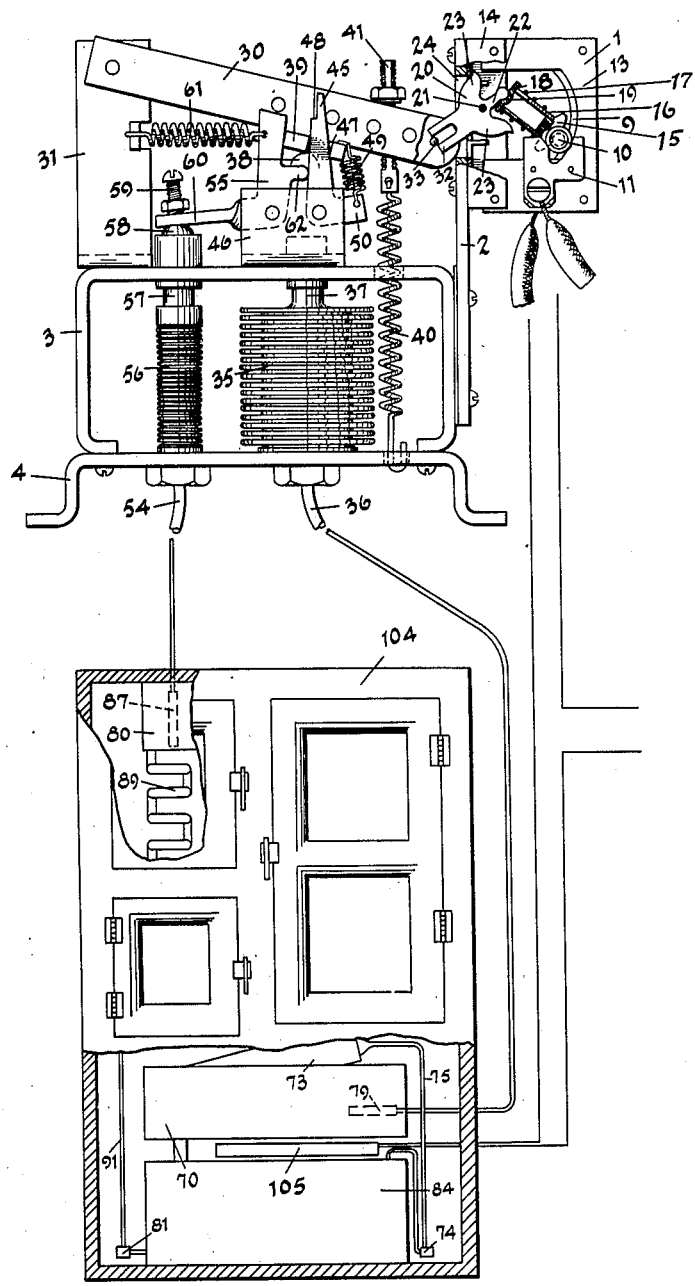

Sept. 15, 1931.   E. C. RANEY   1,823,511
THERMIC CONTROL DEVICE
Filed Sept. 29, 1928    4 Sheets-Sheet 1
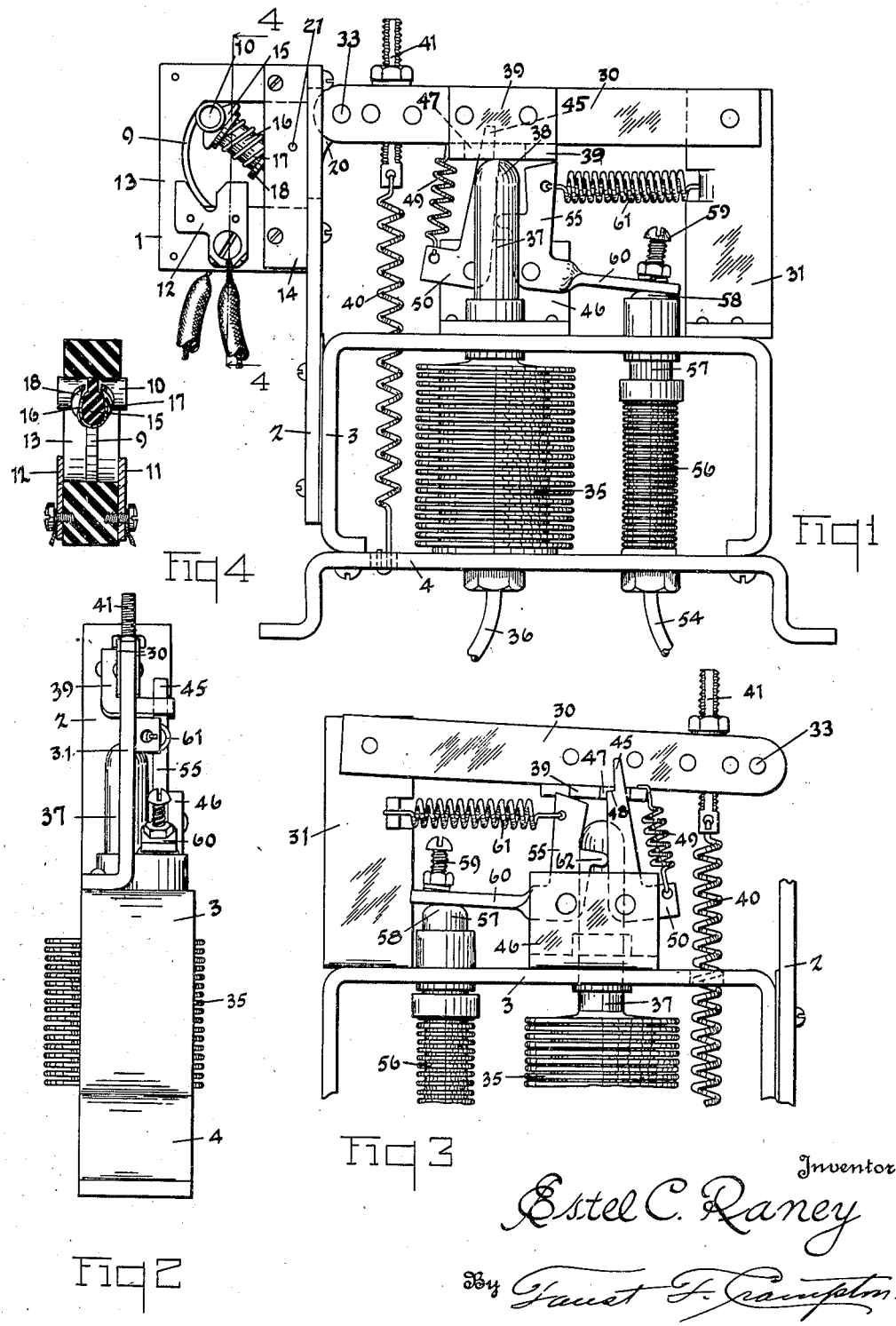
Inventor
Estel C. Raney
By Faust F. Crampton
Attorney Sept. 15, 1931.  E. C. RANEY  1,823,511
THERMIC CONTROL DEVICE
Filed Sept. 29, 1928   4 Sheets-Sheet 2
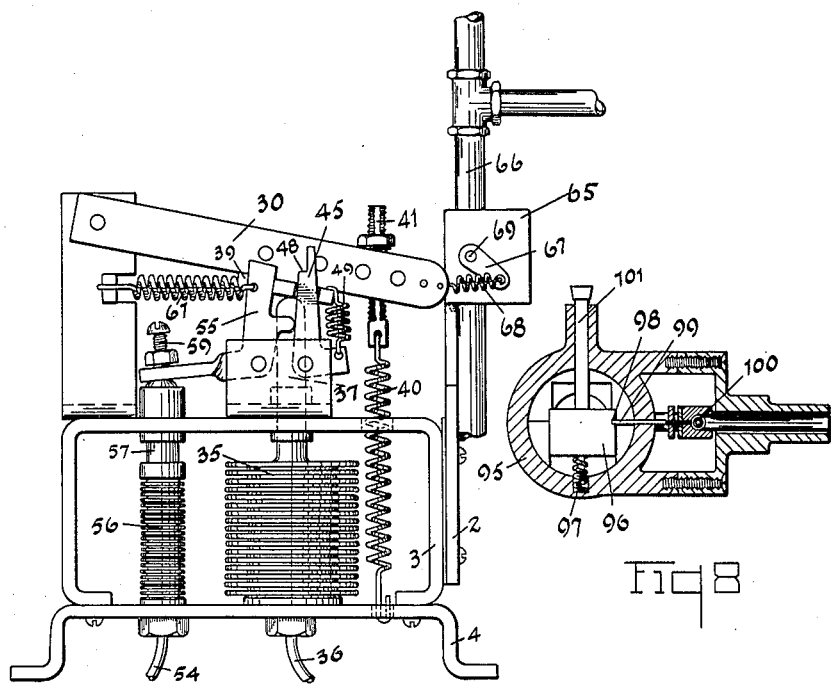
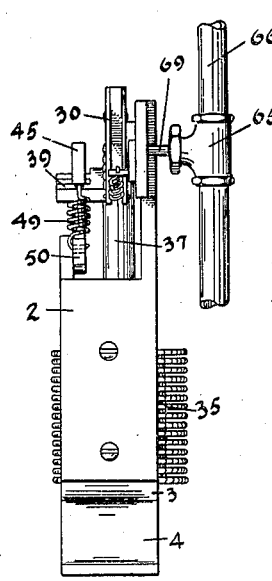
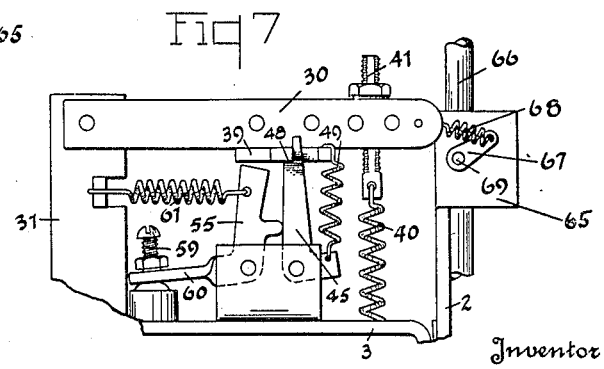
Inventor
Estel C. Raney
By Faust F. Crampton
Attorney

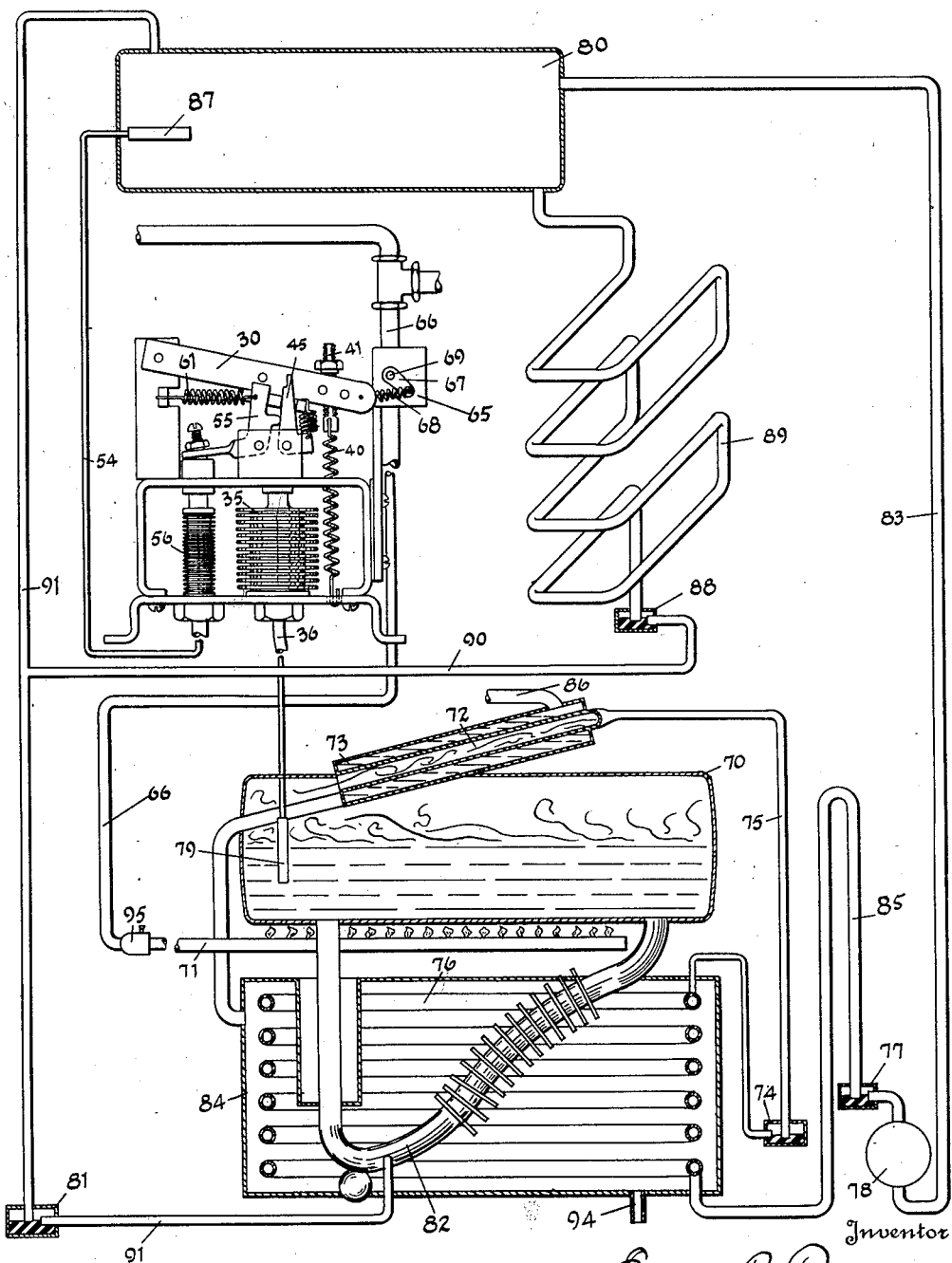

Sept. 15, 1931.  E. C. RANEY  1,823,511
THERMIC CONTROL DEVICE
Filed Sept. 29, 1928  4 Sheets-Sheet 4

Inventor
Estel C. Raney
By Faust F. Crampton
Attorney

Patented Sept. 15, 1931

1,823,511

UNITED STATES PATENT OFFICE

ESTEL C. RANEY, OF COLUMBUS, OHIO

THERMIC CONTROL DEVICE

Application filed September 29, 1928. Serial No. 309,339.

My invention has for its object to provide a means for causing the operations of a member according to the existence of a plurality of conditions in a system, or apparatus, that are brought about by, or result from, the said operations of the member. The device has a plurality of controlling elements that are independently operated and wherein each of the elements is operated according to a certain condition in a system, or apparatus, the said elements intercontrolling so that the results produced by the device will insure the desired performance of functioning of the system or apparatus.

The invention may be used to automatically control a great variety of systems according to the various conditions that may exist in the system, or according to the performance of certain functions that are interrelated in the system. Thus my invention is particularly advantageous when used in connection with a system that is designed to perform a cycle of operations that are successively initiated upon completion of preceding operations as, for example, in refrigerating machines or apparatus.

The invention may be contained in constructions that vary in their details and, to illustrate a practical application of the invention, I have selected two constructions containing the invention and shall describe them hereinafter. The particular constructions referred to are shown in the accompanying drawings and are described hereinafter.

Fig. 1 of the drawings is a front view of a part of a controlling device for controlling an electric switch according to the thermic conditions of a refrigerating apparatus. Fig. 2 is an end view of a part of the device shown in Fig. 1. Fig. 3 illustrates another view of a part of the device shown in Fig. 1, the movable elements being shown in slightly different positions from that shown in Fig. 1. Fig. 4 illustrates a section of a switch that controls an electric heater and is taken along the plane of the line 4—4 indicated in Fig. 1. Fig. 5 illustrates a modified form of the construction shown in Fig. 1. Fig. 6 is an end view of the device illustrated in Fig. 5. Fig. 7 illustrates a part of the device shown in Fig. 5, the movable elements being located in slightly different positions from that in which they are shown to be located in Fig. 5. Fig. 8 illustrates a gas valve that may be used for automatically cutting off a supply of gas to a gas heater when a pilot light is extinguished. Fig. 9 illustrates a refrigerating apparatus that is heated during one of the steps in its cycle of operations by a gas heater. Fig. 10 illustrates a refrigerating apparatus that is controlled through an electric heater.

In the particular forms of device shown, a refrigerating system is caused to perform the different functions for which it is designed by heating a container for a liquid during desired periods separated from each other by periods of cooling and the said periods are varied in their length according to the fulfillment of the conditions, or functions, that the parts of the refrigerating apparatus are designed to perform. In the particular form of device shown in Figs. 1 to 4, a container for a liquid is heated by an electric heater, and the supply of the current to the heater is controlled by a switch 1 that is opened and closed according to the operation of certain elements of the device that respond to conditions in the refrigerating apparatus.

The switch 1 is secured to the plate 2 which is connected to the bracket member 3, that is supported on the base 4. The switch 1 may partake of different forms. In the form of construction shown, it is provided with a contact bar 10 that forms the movable switch contact member. The bar 10 is spring pressed against the contact plates 11 and 12 when the switch 1 is closed. The contact plates 11 and 12 are secured on opposite sides of an insulation block 13 and near its lower end. The block 13 has an inner arcuate edge 9 extending between the legs of the block 13, and the contact bar 10 extends transversely with respect to the arcuate edge 9 and is slidably movable over the arcuate edge 9 of the block 13. The thickness of the block 13 is less than the length of the bar 10 so that when the bar 10 is moved to the lower leg of the block 13, it will make contact with the contact plates 11 and 12. A stirrup 15, of insulating material, engages a central portion of the bar 10 and has a part telescoping in a sleeve 16. The stirrup 15 is spring pressed by means of a spring 17 which is located between the stirrup 15 and a plate 18 of insulating material located on the other end of the sleeve 16. The plate 18 is provided with a recess 19 as shown in Fig. 10. A plate 20 is pivotally supported in a channel plate 14 by means of a pivot pin 21. The plate 20 is located in a slot 24 formed in the bottom of the channel plate 14 and has a finger 22 that extends into the recess 19, and a pair of wings 23, that are located on opposite sides of the finger 22 and form limiting stops to the movement of the plate 20 as they are adapted to engage end portions of the channel plate 14. When the plate 20 is rotated, the finger 22 tilts the sleeve 16 until the point of contact between the end of the finger 22 and the plate 18 is moved to the opposite side of the line extending between the center of the pivot pin 21 and the center of the bar 10, whereupon the spring 17 will cause the bar 10 to slide, or roll, to the opposite end of the arcuate edge 9 of the block 13. Thus the circuit between the contacts 11 and 12 is closed when the bar 10 is shifted to the lower end of the arcuate edge 9 of the block 13, and the circuit is opened when the contact bar 10 is shifted to the upper end of the arcuate edge 9 of the block 13.

The plate 20 is actuated by means of a pivoted arm 30 that is pivotally supported on a bracket 31. The bracket 31 is connected to the top of the bracket member 3. The arm 30 may be formed of two strips of metal that are located on opposite sides of the bracket 31, and are separated from each other by suitable spacing members. The plate 20 has a slotted protruding part 32 and the arm 30 has a pin 33 that extends through the slot. When the arm 30 is raised and lowered, the pin 33 slides in the slot while, at the same time, the finger 22 of the plate 20, changes its angular relation with respect to the axis of the sleeve 16, until the centers of the parts of the toggle, formed between the finger 22 and the sleeve 16, are so located that the bar will be snapped to its open or closed position, depending on the direction of movement of the arm 30.

The arm 30 is hydrostatically raised by the operation of a mechanical bellows 35 containing a liquid which may be subjected to pressure. The bellows 35 is supported on the base 4 and a pipe 36 communicates with the interior of the bellows 35 and contains a liquid through which pressure is transmitted to the bellows 35 for the operation of the arm 30. The upper end of the bellows 35 is provided with a rod 37 that moves through the upper side of the U-shaped bracket 3. The upper end of the rod 37 is, preferably, rounded as at 38 and engages a plate 39 that is secured to one side of the arm 30 and extends across the under side of the arm 30. As the bellows 35 is expanded by the flow of liquid through the pipe 36, the rod 37 presses against the plate 39 to raise the arm 30. The arm 30 in turn operates on the plate 20 and throws the switch 1 to its open position. A spring 40 is connected to the base 4 and extends through the upper side of the U-shaped bracket 3 to the arm 30. It is connected to the arm 30 by means of a threaded pin 41 that may be adjustably located relative to the arm 30 to adjust the tension of the spring 40. The spring 40 will cause the return movement of the arm 30 when it is released and, consequently, will cause the switch to be closed by the operation of the arm 30 on the plate 20.

The arm 30, and consequently the switch 1, is controlled in its return movement by two latch members, one of which operates the other latch member to transfer the control of the switch to the second latch member. The latch member 45 is pivotally supported in a bracket 46 that is secured to the upper side of the bracket 3. The latch member 45 extends through a slot 47 formed in the edge of the plate 39 that protrudes from the side of the arm 30. The latch member 45 has a notch 48 which engages the protruding part of the plate 39. The upper end of the latch member 45 operates as a stop to prevent more than the desired engagement between the latch member 45 and the plate 39. A spring 49 is connected to an arm 50 formed on the latch member 45 and to a protruding part of the plate 39. The spring 49 operates to yieldingly press the latch member against a protruding part of the plate 39 and so that when the arm 30 is raised, above a certain point, the latch member 45 will engage the plate 39.

The other latch member 55 operates to trip the latch member 45 and at the same time engages the arm 30. The latch member 55 is hydrostatically operated by a bellows 56. The bellows 56 is supported on the base 4 and its upper end is provided with a rod 57 that extends through the upper side of the U-bracket 3 and, which has a rounded end 58 that engages the end of the screw 59. The screw 59 is adjustably threaded in an arm 60 that is integrally connected with the latch member 55. A spring 61 is connected to the bracket 31 and the latch member 55 to maintain the end of the screw 59 in contact with the rounded end 58 of the rod 57. Thus the bellows 56 operates to move the latch member 55 angularly against the tension of the spring 61. Such movement, however, does not occur in the cycle of operations of the refrigerating apparatus controlled by the switch 1 until the arm 30 has been raised by the pressure transmitted through the pipe 36 to the bellows 35 that raises the rod 37, that is, the movement of the latch member 55, produced by the bellows 56, takes place only during the time that the switch 1 is open. When the latch member 55 is operated by the bellows 56, the upper end of the latch member 55 passes beneath the protruding part of the plate 39 and locates it in position so as to maintain the arm 30 in its raised position. The latch member 55 has a finger 62 that engages the latch member 45 when the latch member 55 is operated by the bellows 56 and so as to disengage the notch 48 from the protruding part of the plate 39. Thus the arm 30 is released from the control of the latch member 45 and is subjected to the control of the latch member 55. The switch 1 is thus maintained in its open position until the liquid in the bellows 56 recedes therefrom through the pipe 54. When this occurs, the spring 61 draws the latch member 55 from beneath the protruding part of the plate 39 and trips the arm 30 and through the operation of the spring 40, the arm 30 is drawn down, the bellows 35 having contracted by reason of the withdrawal of liquid through the pipe 36. This causes the switch 1 to close the connection between the fixed contacts 11 and 12.

In the operation of the apparatus, the bellows 35 is expanded by liquid that is forced through the pipe 36 into the bellows 35. The expansion is produced by the performance of a certain operation in the apparatus. This occurs when the bellows 56 is contracted as a result of other conditions in the apparatus and, consequently, as the arm 30 is raised, the switch is opened and the arm 30 is engaged by the latch 45. Subsequently, in the operation of the apparatus, the bellows 35 will be contracted and later in the cycle of operation of the apparatus, the bellows 56 will be expanded. This operates the latch 55 to disconnect the latch 45 and place the latch 55 in position to control the return movement of the arm 30. The arm 30 is then dependent upon the contraction of the liquid within the bellows 56. The bellows 56 will contract when a third operation is performed in the apparatus which will cause the latch 55 to disengage the arm 30 and the arm 30 will be moved by the spring 40 which will cause the switch to be closed.

The device shown in Figs. 5, 6, 7, and 9 is so constructed that it will operate a gas valve whereby a gas heater may be controlled according to the performance of the refrigerating apparatus during its cycle of operations. A gas valve 65, located in the gas pipe 66, is connected to the arm 30 by means of an arm 67 and a spring 68. The valve stem 69 is located near the path of movement of the end of the arm 30 and so that when the arm 30 is located above, or below, the end of the arm 67 and the stem 69, the spring 68, which interconnects the ends of the arms 30 and 67, will be subjected to an increased spring tension. When the end of the arm 30 moves to a point sufficiently above the stem 69 and the end of the arm 67 so that the spring 68 will also be located above the stem 69, the valve 65 will be closed. This will occur when the arm 30 is raised by the operation of the bellows 35. When, however, the arm is raised to this position, it is caught by the latch 45 which permits the rod 37 to recede upon the contraction of the bellows 35 without operation of the valve. The arm 30, and consequently the opening of the gas valve 65, is then made subject to the control of the bellows 56. When the bellows 56 expands, the rod 57 transfers the control from the latch 45 to the latch 55 and when the bellows 56 contracts, the arm 30 is again tripped and the spring 40 operates to pull the arm 30 downward which places the spring 68 below the stem 69 and causes the gas valve 65 to be opened.

These controlling movements are produced thermically by the expansion of liquids or gases in metallic capsules that transmit the pressures created therein to the bellows 35 and 56, through the pipes 36 and 54, respectively, according to the performance of interrelated parts of the refrigerating apparatus. The device is particularly adapted for the control of an absorption refrigerating machine as illustrated in Figs. 9 and 10 which is provided with a boiler 70 which is heated by the gas heater 71, as shown in Fig. 9. About 85% of the boiler is filled with a solution of ammonia and water of a density of between 40% and 55%, depending upon operating temperatures that are to be maintained. When the heat is applied by means of the gas heater 71, the ammonia vapor separates from the water and is driven out of the boiler 70 through the pipe 72 which is located in a water cooled rectifier 73 and a large percentage of the water vapor is condensed and returned to the boiler 70 from the lower end of the pipe 72. The ammonia gas passes through a mercury trap 74 to which the pipe 72 is connected by means of a pipe 75. From the mercury trap 74 it enters the condenser 76 where the ammonia vapor is condensed into liquid anhydrous ammonia. Due to the increasing pressure in the boiler, produced by the heat created by the gas heater 71, the liquid anhydrous ammonia is forced out of the condenser 76 through a second mercury trap 77 to the reservoir 78 where it collects until the end of the heating period. Meantime, the liquid in the capsule 79 is expanded which causes the expansion of the bellows 35 and raises the arm 30 to close the gas valve 65 and, consequently, to turn off the heater 71. The arm 30 is then caught in its raised position by means of the latch 45 which holds the arm 30 and the gas valve 65 closed until the control of the arm 30 is shifted from the latch 45 to the latch 55 and is subjected to the operation of the bellows 56. At the instant that the heat is turned off from the boiler 70, the pressures throughout the parts of the absorption refrigerating apparatus are equal. The rectifier 73, however, continues to function, tending to reduce the pressure in the boiler 70, and as the ammonia gas flow is decreased by the shutting off of the heat, the condenser 76 becomes more efficient and a very rapid drop in pressure results in the condenser 76 until a pressure below a condensing pressure is reached. This reduction in pressure is maintained between the trap 77 and the boiler 70 as both the traps 74 and 77 prevent a back flow from the reservoir 78 to the boiler. When the pressure drops, the anhydrous ammonia in the reservoir 78 vaporizes but flow of the vapor towards the boiler 70 is prevented by the mercury column that is thus created in the U-pipe 85, and thereby the liquid anhydrous ammonia is forced out of the reservoir 78 into the evaporator 80 through the pipe 83. The pressure in the evaporator 80 which, at the instance of shutting off the heat, is maximum, becomes equalized with the boiler 70 through the uni-directional trap 81 which allows flow of the liquid through the pipe 91 through a loop 82 to the boiler 70.

The loop 82 has inclined and vertical legs connected to the boiler 70 and the pipe 91 is connected to the lower end of the inclined leg and upon clearing of the pipe 83 of liquid, the gas which has caused the flow from the evaporator 80 to the boiler 70, is suddenly released across the top of the liquid in the evaporator 80 and finds an easy flow through the pipe 91, the trap 81, and the loop 82 to the boiler 70. This sudden flow of the gas lifts the liquid in the loop 82 and discharges it into the boiler 70 at the same time the liquid absorbs the gas and draws the hot liquid down through the vertical leg of the loop 82. This cooled liquid entering the boiler 70 reduces the temperature and thereby the pressure in the boiler 70 causes a flow of gas from the evaporator 80 to the loop 82. Thus the liquid is repeatedly drawn through the pipe 83 and the refrigeration continues.

The loop 82 and the condenser 76 are enclosed in a single shell 84, water being admitted to the bottom of the shell 84 through a connecting pipe 94, and discharged from the top of the shell 84 to the bottom of the rectifier 73 and through a thermostatic valve to the outlet 86. When the refrigeration reaches a point such that a liquid in the capsule 87 freezes and in freezing causes expansion of the liquid contained in the capsule 87, the bellows 56 will be expanded by the transmission of liquid in the pipe 54 and the transfer of the control of the arm 30 is made from the latch 45 to the latch 55. The apparatus is then allowed to rest until it has warmed up to such a point that the liquid within the capsule 87 has melted which causes the contraction of the bellows 56. By the operation of the springs 40 and 61, the arm 30 is tripped by the movement of the latch 55 which again opens the gas valve 65 and the burner 71 is ignited by a suitable pilot light located in a by-pass of the valve 65.

By means of the controlling device, the burner 71 is turned off when the boiler reaches approximately 260 degrees. The latches 45 and 55 prevent the lighting of the burner 71 as the boiler cools since the opening of the valve 65 is dependent upon the de-frosting of the capsule 87. When the capsule 87 has de-frosted, the gas is again turned on.

A mercury trap 88 is located at the lower end of a set of evaporator coils 89. The mercury trap 88 is weighted to counterbalance the static head of the anhydrous ammonia liquid to within an inch of the top of the evaporator 80. In the operation of the absorption machine it is impossible to take out all of the water vapor by means of the rectifier 73. This water vapor is carried over to the evaporator 80 where, as the anhydrous gas boils off, it is deposited in the lower part of the cooling coils 89. This trapped liquid aqua ammonia tends to raise the static head on the trap 88 when the charge of the anhydrous liquid is transferred from the reservoir 78. This increase in head unbalances the trap 88 allowing the liquid aqua ammonia to flow through the pipe 90 to the return gas line 91 and the trap 81 to the loop 82. When the aqua ammonia has been returned, the trap 88 again seals and maintains its predetermined head of anhydrous ammonia for which the mercury within the trap 88 has been weighted.

In order that the burner 71 may be lighted automatically at the desired times in the cycle of operations of the apparatus, a suitable pilot light may be located in proximity to the line of holes from which the fuel gas escapes. Preferably, such a pilot light is automatically controlled so as to shut off the gas from the pilot light and the burner when the pilot light becomes extinguished for any reason. In Fig. 8 is illustrated a sectional view of the pilot burner indicated diagrammatically in Fig. 9. The pilot burner has a gas valve 95. The movable valve member is in the form of a plate 96 that is slidably supported in the shell of the valve 95. It is spring pressed by means of the spring 97 to close the passage-way through the valve 95. The plate 96 has a notch 98 and a rod 99 having, preferably, a large coefficient of expansion, is secured in the valve casing so as to engage in the notch 98 when the rod 99 has been heated to substantially that temperature that will normally be produced by the heat of the pilot flame that is located at the outlet of the passage-way 100. The depth of the notch 98 is such that when the pilot light becomes extinguished, the rod 99 will, when it becomes cool, contract in its linear dimensions sufficiently to withdraw its end from the notch 98 and thus release the movable plate 96 which is subject to the pressure of the spring 97. The spring 97 is then permitted to move the plate 96 to close the passage-way through the valve 95.

The valve 95 is located in the pipe 66 at a point intermediate the valve 65 and the burner 71 and the pilot light of the burner 71. When, therefore, the pilot light becomes extinguished, the pilot burner and the burner 71 are shut off from connection with the source of supply of fuel gas notwithstanding the operations of the gas valve 65.

In order that the pilot light may be restored, the plate 96 must be moved so as to compress the spring 97 and held in this position to permit the fuel to pass to the pilot burner which is then ignited and, while the movable valve member or plate 96 of the valve 95 is held in this position, the pilot light is given opportunity to heat the rod 99 sufficiently to engage the plates 96. In order that the plate 96 may be thus held in position until it is secured in that position by the rod 99, the valve 95 is provided with a push rod 101 which extends through the wall of the valve 95. The rod 101 may be held down while heat from the pilot light is conveyed to the rod 99 to cause it to engage the movable valve member 96.

In Fig. 10 is illustrated a conventional domestic refrigerator 104 that receives its energy for its manipulation from an electric heater 105. The electric heater 105 is controlled by the switch 1. The electric heater 105 is connected to a suitable source of current and to one of the contacts 11 and 12 while the other of the contacts is also connected to a source of supply of electric current. The current through the heater 105 is controlled according to the temperature produced in the boiler 70 which, when it is raised to a certain point and maintained at that point sufficiently long to produce the expansion of the fluids within the capsule 79, the switch 1 is opened and, when the capsule 87 has de-frosted, the switch 1 is closed. Thus the controlling device in each case is operated to produce variable periods of sequential operations of the refrigerating apparatus according to the variable conditions to which the apparatus or parts thereof may be subjected, and so as to produce regulated sequential steps in the performance of the apparatus whereby the apparatus may maintain most efficiently a substantial uniform low temperature within the chambers of the refrigerator.

I claim:

1. In a refrigerating apparatus, a heater for heating a part of the apparatus, a movable member for connecting and disconnecting the heater with a source of supply of that which the heater consumes to produce heat for producing changes in temperature of a part of the apparatus, means for operating the movable member for connecting the heater, a plurality of thermic devices for controlling the said means in response to changes in the temperature of a plurality of parts of the apparatus, and means interposed between the thermic devices for transferring the control of the operating means from one thermic device to another thermic device.

2. In a refrigerating apparatus, a heater for heating a part of the apparatus, a movable member for connecting and disconnecting the heater with a source of supply of that which the heater consumes to produce heat, a means operating the said movable member to disconnect the heater, a latch for locking the movable member in its disconnected relation, a second latch having a means for releasing the first named latch from the member and transferring the locking of the movable member in its disconnected relation from the first named latch to the second named latch, and means for operating the second named latch to release the movable member and cause the connecting means to connect the heater.

3. In a refrigerating apparatus, a heater for heating a part of the apparatus, a movable member for connecting and disconnecting the heater with a source of supply of that which the heater consumes to produce heat, means for operating the movable member to connect the heater, a mechanical bellows connected to a part of the apparatus and having means for disconnecting the heater and operated by the expansion produced by the heat from the heater, means for locking the movable member to lock the heater in its disconnected relation notwithstanding the withdrawal of the disconnecting means, and means for releasing the locking means to cause the connecting means to operate to connect the heater.

4. In a refrigerating apparatus, a heater for heating a part of the apparatus, a movable member for connecting and disconnecting the heater with a source of supply of that which the heater consumes to produce heat for producing changes in temperature of a part of the apparatus, means for operating the movable member for connecting the heater, a mechanical bellows having means for disconnecting the heater and operated by expansion produced by the heat from the heater, and a second mechanical bellows controlling the connecting means and operated in response to the changes of the physical conditions in another part of the apparatus.

5. In a refrigerating apparatus, a heater for heating a part of the apparatus, a movable member for connecting and disconnecting the heater with a source of supply of that which the heater consumes to produce heat for producing changes in temperature of a part of the apparatus, means for operating the movable member for connecting the heater, a mechanical bellows having means for disconnecting the heater and operated by the expansion produced by the heat from the heater, means for locking the movable member in its disconnected relation, and a second mechanical bellows for unlocking the movable member and operated in response to the changes of the physical condition in another part of the apparatus.

6. In a refrigerating apparatus, a heater for heating a part of the apparatus, a movable member for connecting and disconnecting the heater with a source of supply of that which the heater consumes to produce heat for producing changes in temperature of a part of the apparatus, means for operating the movable member for connecting the heater, a mechanical bellows having means for disconnecting the heater and operated by the expansion produced by the heat from the heater, a latch for securing the movable member in its disconnected relation, a second latch having means for transferring the control of the said movable member from the first named latch to the second named latch, and a second mechanical bellows for controlling the said latches and operating upon its expansion to disconnect the first named latch with the movable member and to cause engagement of the movable member with the second named latch, and to disconnect the second named latch from the movable member when the said second mechanical bellows contracts.

7. In a refrigerating apparatus, an electric heater for heating a part of the apparatus, a switch for connecting and disconnecting the heater with a source of supply of an electric current, means for operating the switch to connect the heater, a pair of thermic devices responsive to changes in temperature in a plurality of parts of the apparatus for controlling the closing of the switch, and means interposed between the thermic devices for shifting the control of the switch from one thermic device to another thermic device.

8. In a refrigerating apparatus, an electric heater, a switch for connecting and disconnecting the heater with a source of supply of an electric current, means for operating the switch to connect the heater with the source and means responsive to the temperature in a part of the apparatus heated by the heater for disconnecting the heater, means for preventing the operation of the connecting means notwithstanding the reduction in the temperature in the said part of the apparatus produced by the disconnection of the heater, and means for controlling the said closing means to cause the switch to be closed when the temperature of another part of the apparatus becomes a predetermined amount.

In witness whereof I have hereunto signed my name to this specification.

ESTEL C. RANEY.